Figure 1A:
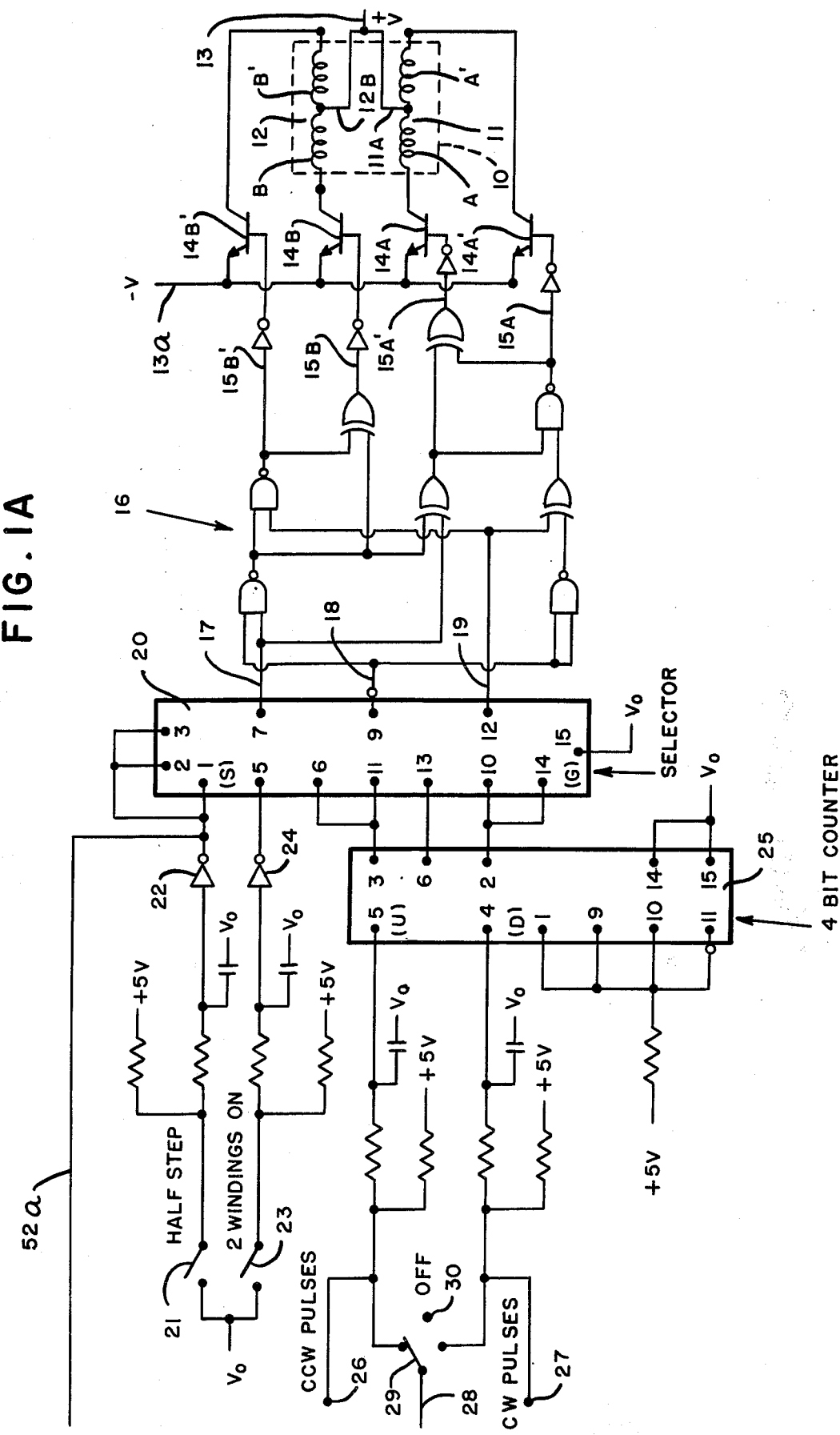
Figure 1B:
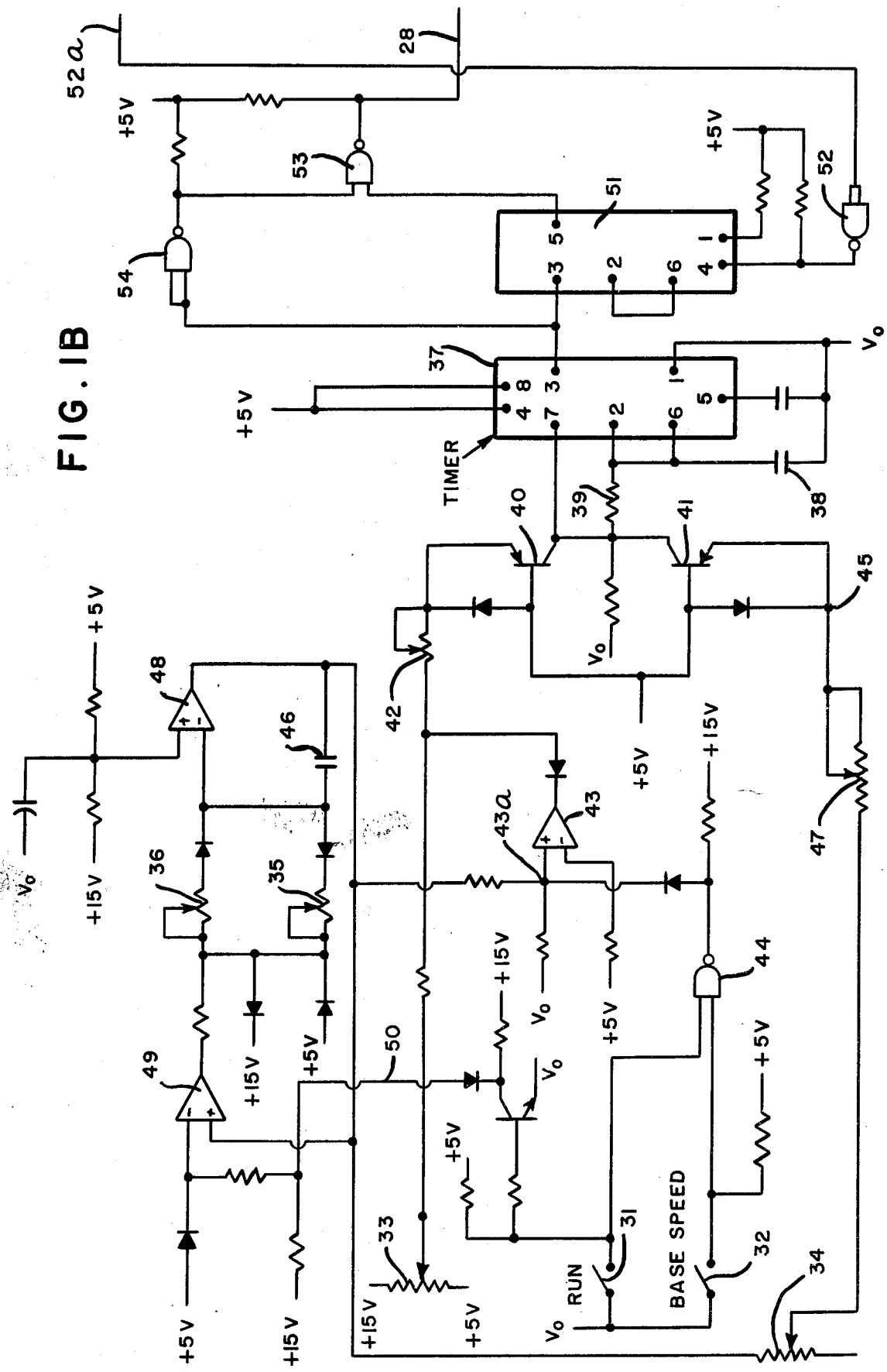

United States Patent [19]

Leenhouts

[11] 4,153,866
[45] May 8, 1979

[54] PULSE TO STEP STEPPING MOTOR CONTROL CIRCUIT

[75] Inventor: Albert C. Leenhouts, Harwinton, Conn.

[73] Assignee: The Superior Electric Company, Bristol, Conn.

[21] Appl. No.: 797,150

[22] Filed: May 16, 1977

[51] Int. Cl.² ........................................... H02K 37/00
[52] U.S. Cl. .................................................... 318/696
[58] Field of Search ......................... 318/685, 696, 138

[56] References Cited

U.S. PATENT DOCUMENTS

| | | | |
|---|---|---|---|
| 3,736,488 | 5/1973 | Abraham et al. | 318/696 |
| 3,746,958 | 7/1973 | Leenhouts | 318/696 |
| 3,787,727 | 1/1974 | McSparran | 318/696 |
| 3,968,416 | 7/1976 | Leenhouts | 318/696 |

OTHER PUBLICATIONS

IBM Technical Disclosure Bulletin, vol. 17, No. 11, Apr. 1975, Programmable Stepper Motor Control, Check et al.

Primary Examiner—Gene Z. Rubinson
Attorney, Agent, or Firm—Ernest M. Junkins

[57] ABSTRACT

A circuit for causing command pulses to control the energization of a two winding phase bifilar stepping motor to produce a step or half step by either one or both phases being energized for each command pulse and in which the circuit self-generates command pulses which have a minimum selectable base rate.

10 Claims, 2 Drawing Figures

PULSE TO STEP STEPPING MOTOR CONTROL CIRCUIT

The present invention relates to controlling the energization of the windings of a stepping motor to cause each command pulse to produce either a step or a half step. The command pulses may be received from an external source or may be generated internally by a variable rate oscillator. Such circuits have heretofore been known, in whole or in part, as for example, by being disclosed in U.S. Pat. Nos. 3,077,550; 3,280,395; 3,746,958 and 3,968,416, all assigned to the assignee of the present invention in addition to being commercially available from the said assignee under the Reg. Trademark "SLO-SYN".

An object of the present invention is to provide a pulse to step motor control circuit for a two winding phase, bifilar stepping motor which is capable of accepting command pulses that are either self-generated or received from an external source and produce either a half or full step for each command pulse.

Another object of the present invention is to achieve the above object with a circuit which enables the selection of either one or both windings of the motor to be energized for each full step.

A further object of the present invention is to provide a pulse to step motor control circuit which self-generates command pulses with the command pulses being capable of having a settable minimum base rate.

Still another object of the present invention is to achieve the above objects with a stepping motor control circuit that is economical to manufacture and reliable and durable in use.

A feature of the present invention resides in the ability of a motor control circuit to accept a command pulse and to change the energization of the windings of a two winding phase bifilar stepping motor of the type disclosed in the above-noted patents to produce a step. In such a motor, the windings are capable of being energized in a repeating four step sequence and the present invention enables a choice of having the step produced for a command pulse be either a full step, i.e., one of the four produced in a four step sequence or else be a half step with a half step being that produced if the windings are energized according to a repeating eight step sequence. Each sequence however produces the same extent of motor movement. Moreover, the circuit enables the selection of a step that may be produced by simultaneous energization of two windings in a four step sequence to be produced by energizing just one winding, thereby decreasing the power requirements by essentially one-half while only decreasing torque by about 30–40%.

While the circuit is capable of accepting command pulses from an external source, the circuit further enables command pulses to be self-generated by the use of a variable rate oscillator whose rate of change is controlled to assure that acceleration and deceleration of the motor is within the motor's velocity change ability. The circuit permits the oscillator to have a base speed or minimum pulse rate with the base speed rate being selected to be that which is normally above the primary resonant stepping speed of the motor which not only assures that the motor will not be required to operate at such a resonant rate but also minimizes the time required for acceleration and deceleration as the motor starts and terminates movement at the base speed rate. Additionally, if desired, pulses may be generated continuously at the base speed rate.

Other features and advantages will hereinafter appear.

In the drawing, the sole FIGURE is a block and electrical schematic diagram of the present invention.

Referring to the drawing, a stepping motor indicated by the reference numeral 10 has two winding phases 11 and 12 with the winding phase 11 having coils A and A' and the winding phase 12 having coils B and B'. The coils are centertapped as at 11A and 12B and both are connected to a positive terminal 13 of unidirectional voltage. A negative terminal of the power source, indicated by the reference numeral 13a, is connected through switching devices as represented by transistors 14A', 14A, 14B and 14B' to the respective ends of the coils. Each coil may accordingly be energized by being connected across the source of unidirectional power by its switching device being caused to be conducting.

The state of conduction of each of the switching devices is controlled by the binary state voltage on switching leads 15A', 15A, 15B and 15B' that are connected to each one's respective switching device. The switching leads constitute the output of a decoding matrix, generally indicated by the reference numeral 16 with the matrix 16 having three input leads 17, 18 and 19 and consisting of the gates connected in the manner shown. Each of the coils may be energized separately and if two coils are energized then they must be in different phases as only one coil may be energized in a phase at a time. Accordingly, as the leads 17, 18 and 19 may have eight different possible binary state conditions, conveniently designed by numerals 0–7 inclusive the matrix 16 causes for the 0 condition on the leads 17–19, A' and B to be energized by only the switching devices 14A' and 14B being rendered conducting. For a binary condition represented by the numeral 1, coil B is energized by only switching device 14B being rendered conducting while for a binary condition represented by the numeral 2, only coils A and B are energized. For the remaining binary, conditions of 3–7 on the input leads 17–19, coils A, AB', B', A'B' and A' will respectively be energized.

In a normal four step sequence with two windings being simultaneously energized, only binary conditions of 0, 2, 4 and 6 appear on the input leads 17–19 to produce the sequence A'B, AB, AB', and A'B' while in an eight half step sequence, all of the above-noted eight binary conditions appear. For the full step sequence, where it is desired to have four steps with only one winding energized per step, then only binary conditions of 1, 3, 5, and 7 appear and are converted by the matrix 16 to produce energization of the windings A', B', A and B respectively.

The input leads 17–19 constitute three outputs of a quadruple two line to one line data selector/multiplexer and inverter indicated by the reference numeral 20 which is an integrated circuit type 74LS158. The input terminals indicated by the numerals within the block 20 representing the selector have their terminal 1 connected to a switch 21, denoted HALF STEP, through the electrical components shown, including an inverting amplifier 22. The terminal 5 is connected to a switch 23, denoted 2 WINDINGS ON, also through the components shown, including an inverting amplifier 24. Terminals 6, 11, 13, 10 and 14 of selector 20 are connected to three output terminals of a four bit binary up/down counter which may be an integrated circuit type SN74LS193 and indicated by the reference numeral 25.

The different terminals of the up/down counter 25 are connected as shown to the other components with the terminal 5 being connected to a contact 26 while the terminal 4 is connected to a contact 27. A pulse on the contact 26 denoted CCW pulses, consisting specifically of a negative to positive change in binary voltage, will cause the counter 25 to increase its count by 1 while a pulse on the contact 27 will cause the counter to decrease its count by 1. The counter is connected so that its maximum count range is 0–7 with the instantaneous count thereof appearing as a binary condition on the three leads connected to the terminals 3, 6 and 2 thereof. These leads are in turn connected to the indicated terminals of the selector 20.

With the above circuit and with switches 21 and 23 being open, as shown, each pulse received on the contact 26 will cause the counter 25 count to increase by 1 and which when applied to the selector 20 together with the binary 0 state on the selector 20 terminals 1 and 5 caused by the switches 21 and 23 being open, will produce energization according to the four step one winding energized sequence, namely producing on the input leads 17–19 sequential binary conditions of 7, 5, 3 and 1.

If the switch 23 is closed, commanding that the four step sequence be followed but with two windings energized, then binary conditions of 6, 4, 2, and 0 will sequentially appear on the leads 17–19 producing sequential energization of the coils A'B', AB', AB and A'B. For the eight step sequence, wherein the switch 21 is closed but the switch 23 is open, then binary conditions of 7-0 will sequentially appear on the leads 17–19 effecting energization of the coils in accordance with the above-noted eight step sequence.

On the other hand, if pulses appear on the contact 27 from an external source, the counter 25 will count down and cause the sequences above-noted to appear but in the reverse order so that the motor will move in the opposite direction from that caused by external input pulses applied on the contact 26.

While the above description relates to the application of individual command pulses to the motor circuit, the present invention is capable of providing internally generated command pulses which appear on a lead 28 connected to a three position switch 29 which has one position for connection to the contact 26, another position for connection to the contact 27, and a third position for connection to an "off" contact 30.

The system is capable of providing self generated command pulses at either a selectable base speed rate or at selectable high speed rate. When a RUN switch 31 is closed, pulses are generated beginning at the base speed rate and increasing in rate to the selectable high speed rate where this rate is continued until the switch 31 is opened. Pulses then are generated at a decreasing rate with the last pulse or pulses being at the base speed rate.

Another switch 32, denoted BASE SPEED, is provided and which when closed, causes the shelf-generated command pulses to continually appear at the base speed rate that is basically determined by the setting of an adjustable resistor 33. The high speed rate is determined basically by the setting of an adjustable resistor 34. The ramp of the acceleration pulses is set by a variable resistance 35 while the deceleration ramp is set by the setting of a variable resistance 36 with the two ramps being essentially linear.

The pulses are generated by operation of a timer 37 which is herein specifically an integrated circuit type SE555V and which is connected for a stable operation in order to trigger itself and freely run as a multi-vibrator. A capacitor 38 is connected to the terminals 2 and 6 thereof and when it has a voltage thereacross that is about two-thirds the voltage applied to the terminal 8 thereof, the timer is triggered causing its output terminal 3 to change from a high to a low state where it remains until the capacitor 38 is discharged to a voltage value of approximately one-third the terminal 8 voltage. The terminal 3 will then shift to a high state and the capacitor 38 will begin to be charged through a resistor 39 connected to a pair of transistors 40 and 41. When the voltage across the capacitor has achieved the above-noted level, the terminal 3 output will again be reduced to a low state where it remains until the capacitor 38 is discharged to a voltage value of approximately one-third the terminal 8 voltage. The terminal 3 will then shift to a high state and the capacitor 38 will again begin to be charged. The rate of the changes in the value of the voltages at the terminal 3 is basically determined by the charging rate of the capacitor 38 which in turn is dependent upon the current through the resistor 39 which in turn is dependent upon the current flow through the transistors 40 and 41.

The transistor 40, when the BASE SPEED switch 32 is closed, provides a value of current flow that depends upon the setting of the base speed adjustable resistor 33 with the value thereof being altered by a trimming adjustable resistance 42. Accordingly, whenever the switch 32 is closed, current flows through the transistor 40 which supplies a minimum value of charging current to the capacitor 38 to cause the timer to produce pulses at a base speed rate, with one typical rate being 400 steps per second. This charging current is permitted to flow through the emitter-collector path of transistor 40 by the output of an operational amplifier 43 being high. This state is achieved by the closed BASE SPEED switch 32 causing the output of an open collector NAND gate 44 which is connected to the + input terminal of the amplifier 43, at a junction indicated by the reference character 43a, to become high. As the + input terminal of the amplifier 43 has a higher potential than the − input terminal, the amplifier's output thus becomes high. If base speed operation is not desired, the BASE SPEED switch is open, the junction 43a has essentially a ground potential which causes the amplifier's output to be low, which drains the changing current that had, in the closed position of switch 32, been passed through the transistor 40. The switching of switch 32 accordingly immediately begins or ceases any charging of capacitor 38 through the transistor 40 and eliminates base speed operation essentially instantaneously with switch operation.

When the RUN switch 31 is closed, the capacitor 38 is charged by current through both transistors 40 and 41 even if the BASE SPEED switch 32 is open. The base speed rate is effected by the output of gate 44 going high when RUN switch 31 is closed, causing the output of amplifier 43 to become high and the conduction of base rate charging current to the capacitor 38 through the transistor 40. Further, the transistor 41 begins to conduct when a voltage appears at a point 45 that is greater than essentially 5 volts with the latter voltage being determined by the charge across a capacitor 46. Thus as the charge across the capacitor 46 increases, the voltage at the point 45 increases and high speed charging current increasingly flows through the transistor 41 to the capacitor 38. The value of the high speed charging current is limited by the high speed rate adjustable resistor 34 together with a trimmer resistor 47, both of which are in the high speed charging current path.

The capacitor 46 is charged by the output of an operational amplifier 48 having its positive input lead connected to a source of essentially constant voltage and its negative input lead connected to the output of another operational amplifier 49. The output of the amplifier 49 to the amplifier 48 is through parallel paths with one including the deceleration ramp resistor 36 and the other including the acceleration ramp resistor 35. The inputs of the amplifier 49 include a lead 50 interconnected to the RUN switch 31 so that the voltage thereon becomes high when it is desired to generate internal pulses by the RUN switch 31 being closed. Whenever the positive input of amplifier 49 becomes positive with respect to its negative input, the output thereof becomes positive causing the voltage at the negative terminal of operational amplifier 48 to become negative and permitting a voltage to be applied across the capacitor 46. The operational amplifier 48 accordingly, by having an increasing voltage difference between its two input terminals, increases its output voltage and hence the voltage across the capacitor 46. This voltage is also applied, through the resistors 34 and 47, to the point 45 to cause conduction of transistor 41. It will be noted that the charging rate of the capacitor 46 through the resistor 35 is limited by its setting and hence sets the charging rate of the capacitor 46. The system will thus reach and remain at a steady state condition wherein the setting of the resistor 34 sets the maximum rate of the timer 37 and hence the maximum rate of the command pulses.

When it is desired to stop generating internal command pulses, the switch 31 is opened causing the lead 50 to become low which in turn causes the output of operational amplifier 49 to become positive. The operational amplifier 48 receives the positive current through the deceleration ramp resistor 36 at its negative terminal, and hence decreases the output of the amplifier 48 which permits the capacitor 46 to discharge. The rate of the timer 37 will accordingly decrease until the point 45 becomes less than about 5 volts which ceases conduction through the transistor 41. Additionally, the transistor 40 will remain conducting until the point 43a connected to the positive terminal of the amplifier 43 becomes negative by the voltage at the capacitor 46 becoming less than 5 volts. It will be noted that the terminal 43a is also connected to the output of gate 44 which has become essentially grounded and hence when the point 43a has a voltage value which is incapable of operating the amplifier 43, its output goes low, stopping conduction through the transistor 40 and hence preventing any charging of the capacitor 38.

While the voltage at the capacitor 46 determines the charging current conduction through both transistors 40 and 41, for the last pulse or pulses, the current conducted through the transistor 41 is negligible, so that the last pulse or pulses appear at the base rate speed.

In accordance with the present invention, when it is desired to operate the motor in any one of three modes with one mode being the production of half steps with self-generated pulses, the output terminal 3 of the timer 37 is connected to an input terminal of a D-type edge triggered flip flop 51 which may be a type 74LS74 with an additional input being the output of a gate 52 whose input is essentially connected to the half step switch 21 by a lead 52a. The output from the flip flop 51 constitutes one input to a gate 53 with the other input thereto being connected to the output of another gate 54 having its input also connected to the terminal 3 of the timer 37. The output of the gate 53 is connected to the lead 28 and is the lead on which the self-generated pulses are transferred to the switch 29.

The timer 37 is designed to run at a speed which is twice the desired full step speed set by the base speed setting resistor 33 and the high speed setting resistor 34. Thus, for example, if the base speed is set at 200 steps per second, the timer 37 operates at 400 pulses per second. Whenever the system has the switch 21 open to provide for full step energization, the terminal 5 alternates its state with each pulse so that only every other pulse from the terminal 3 of the timer has the same terminal 5 state and passes through the gate 53 onto the lead 28 to become capable of changing the energization of the motor 10. Whenever it is desired to provide half steps, the gate 52 maintains terminal 5 continuously at the same state and every pulse from the timer 37 accordingly passes through the gate 53 to the lead 28 and becomes capable of effecting a change of energization of the motor.

The matrix 16 is preferably composed of integrated circuit types 74LS86 and 74LS00; the gates 52, 53, and 54, type 74LS26; the inverting amplifiers 22 and 24, type 74LS14 and the operational amplifiers 43, 48, and 49, type LM324.

It will be understood that the different heretofore mentioned switches may be of a type that are mechanically controlled or if desired of a type that are electrically operated by signals from external circuits.

It will accordingly be understood that there has been disclosed a stepping motor control circuit for changing the energization of a stepping motor for each command pulse received. The energization may follow a sequence of four full steps with two coils, simultaneously energized for each step; a sequence of four full steps with only one coil energized for each step or a sequence of eight half steps with some steps having only one coil energized and the remaining steps have two coils simultaneously energized. In addition, the circuit provides for the self-generation of command pulses with the ability to set a base rate or speed at which the motor begins and terminates its movement with the selection of maintaining the motor speed at the base rate or running the motor at a settable higher than base rate speed with velocity changes being controlled.

Variations and modifications may be made within the scope of the claims and portions of the improvements may be used without others.

I claim:

1. A stepping motor control circuit for changing the energization of the windings of a stepping motor having two energizable winding phases with each phase being energizable to have one state or another state comprising a first pair of switching devices connected to the one phase and having conditions for energizing or non-energizing the one state and for energizing or non-energizing the other state, a second pair of switching devices connected to the second phase and having conditions for energizing or non-energizing the one state and for energizing or non-energizing the other state, means connected to receive command pulses and change one condition of one of the switching devices for each command pulse received with the changes following a repeating plural step sequence with there being a first sequence causing only one switching device to have an energized condition for each step, a second sequence in which both switching devices have an energized condition for each step and a third sequence in which one and both switching devices alternately have an energized condition for each step and means for selecting one of the sequences for the changes to follow and in which the control circuit includes oscillator means for generating pulses and means for receiving said pulses and supplying command pulses to the means for receiving command pulses and in which the supplying means includes means connected to the selecting means for supplying every other generated pulse as a command pulse when the first and second sequences are selected and every generated pulse when the third sequence is selected.

2. The invention as defined in claim 1 in which the first and second sequence have the same number of changes, in which the third sequence has twice as many changes as the first and second sequences and in which all sequences energize the winding phases to produce the same extent of movement for a sequence.

3. The invention as defined in claim 2 in which the means for changing the condition includes an up/down counter having a minimum count at least equal to the number of steps in the third sequence and in which the selecting means in selecting the third sequence causes the means for changing to provide a different condition of the switching means for each count.

4. The invention as defined in claim 2 in which the means for changing includes an up/down counter, means for changing the counter count for each command pulse and in which the selecting means correlates the count of the counter with the different conditions.

5. The invention as defined in claim 4 in which the selecting means includes terminals connected to the counter for receiving a binary representation of the counter count, a terminal connected to receive a binary representation commanding selection of either one or both switching devices to have an energized condition and a terminal connected to receive a binary representation commanding selection of either the first and second sequences or the third sequence.

6. The invention as defined in claim 5 in which the selecting means has three outputs with each capable of having a binary representation thereon and in which there is a decoding matrix connected between the three outputs and the switching devices for effecting the condition of the switching devices in accordance with the binary representations on the three outputs.

7. The invention as defined in claim 1 in which the control circuit includes means for generating pulses, means for actuating the pulse generating means and means for setting a base rate at which pulses are generated.

8. The invention as defined in claim 7 in which the actuating means includes means for actuating the pulse generating means to produce pulses at only the base rate.

9. The invention as defined in claim 7 in which the actuating means includes means for actuating the pulse generating means to produce pulses at a higher rate than the base rate and in which actuating means include means for causing the pulse generating means to increase the rate of the generated pulses to the higher rate from the base rate upon actuation whereby at least the first generated pulse has a rate essentially at the base rate.

10. The invention as defined in claim 7 in which the actuating means includes means for removing the actuation of the pulse generating means when the pulse generating means is generating pulses at a higher rate than the base rate and in which the actuating means includes means for causing the pulse generating means after removal of the actuation to decrease the rate of the generated pulses to the base rate with at least the last pulse having a rate essentially equal to the base rate.

* * * * *